United States Patent
Likovich et al.

(10) Patent No.: US 12,518,861 B2
(45) Date of Patent: Jan. 6, 2026

(54) SYSTEMS AND METHODS FOR ADJUSTING TRAINING DATA BASED ON SENSOR DATA

(71) Applicant: Nymbl Science, Denver, CO (US)

(72) Inventors: Edward Likovich, Englewood, CO (US); Karl Archuleta, Highlands Ranch, CO (US); Nathan Estrada, Westminster, CO (US); Joseph Mattleman, Lafayette, CO (US); Thomas Virden, Boulder, CO (US); James Cook, London (GB); Aaron Duke, Denver, CO (US)

(73) Assignee: NYMBL SCIENCE, Denver, CO (US)

( * ) Notice: Subject to any disclaimer, the term of this patent is extended or adjusted under 35 U.S.C. 154(b) by 1209 days.

(21) Appl. No.: 17/150,187

(22) Filed: Jan. 15, 2021

(65) Prior Publication Data

US 2021/0225483 A1    Jul. 22, 2021

Related U.S. Application Data

(60) Provisional application No. 62/962,674, filed on Jan. 17, 2020.

(51) Int. Cl.
| | | |
|---|---|---|
| *G01N 33/48* | (2006.01) | |
| *G06N 3/08* | (2023.01) | |
| *G06V 40/70* | (2022.01) | |
| *G16H 20/30* | (2018.01) | |
| *G16H 20/70* | (2018.01) | |

(52) U.S. Cl.
CPC ............ *G16H 20/30* (2018.01); *G06N 3/08* (2013.01); *G06V 40/70* (2022.01); *G16H 20/70* (2018.01)

(58) Field of Classification Search
None
See application file for complete search history.

(56) References Cited

U.S. PATENT DOCUMENTS

| 9,149,222 B1 | 10/2015 | Zets et al. |
|---|---|---|
| 2006/0005846 A1 | 1/2006 | Krueger et al. |
| 2014/0276130 A1 | 9/2014 | Mirelman et al. |
| 2017/0197115 A1 | 7/2017 | Cook et al. |
| 2018/0220935 A1* | 8/2018 | Tadano ............... A61B 5/11 |

FOREIGN PATENT DOCUMENTS

JP    2019508191 A    3/2019

OTHER PUBLICATIONS

European Patent Office, Extended European Search Report issued in European Patent Application No. 21741127.1, Jan. 25, 2024, pp. 1-8.
Conradsson et al., "A novel 1-27 conceptual framework for balance training in Parkinson's disease-study protocol for a randomised controlled trial", BMC Neurology, Sep. 27, 2012, pp. 1-10, vol. 12(11).
Patent Cooperation Treaty, International Search Report issued in PCT/US2021/013584, Jul. 13, 2021, pp. 1-2.
Japanese Intellectual Property Office, Official Action issued in Japanese Patent Application No. 2022-528291, Jan. 14, 2025, pp. 1-3, English translated.

* cited by examiner

*Primary Examiner* — Anna Skibinsky
(74) *Attorney, Agent, or Firm* — Pillsbury Winthrop Shaw Pittman LLP (57) ABSTRACT

Disclosed are embodiments for facilitating generation of training data, which includes information regarding a set of physical tasks or cognitive tasks to be performed by a user (e.g., separately or concurrently), and adjusting the training data based on a performance of the user. The tasks may be directed to improving a specific health condition (e.g., balance capabilities of the user). The system obtains sensor data that is representative of user actions in performance of the tasks from sensors of a user device. The sensor data may be processed to determine performance data (e.g., physical or cognitive performance) that is indicative of the performance of the user in performing the tasks. The training data may be adjusted based on the performance data (e.g., one or more tasks or task parameters are adjusted to increase or decrease a difficulty level for the user in performing the tasks).

24 Claims, 5 Drawing Sheets

SYSTEMS AND METHODS FOR ADJUSTING TRAINING DATA BASED ON SENSOR DATA

CROSS-REFERENCE TO RELATED APPLICATION

The present application claims priority to U.S. Provisional Patent Application No. 62/962,674 filed on Jan. 17, 2020 entitled "SYSTEM AND METHOD FOR WELLNESS MANAGEMENT," the contents of which are herein incorporated by reference in their entirety.

BACKGROUND

Wellness management aims to manage a person's lifestyle, e.g., health, and is key for preventive care and chronic disease treatments that help a person maintain and improve his/her health. The wellness management programs may involve assigning physical training exercises or cognitive exercises to a person, evaluating the performance of the person in performing the exercises, and providing treatment accordingly.

One can find plenty of wellness resources online, such as videos, discussion, articles on various physical exercises to be performed for general health or to improve specific health condition, e.g., improving a balance condition for a human. However, these resources are not personalized or customized to a specific person. Personalizing the wellness programs (e.g., physical exercises to be performed) to a specific person is a very important factor in helping people improve their wellness effectively as different people can have different capabilities, health conditions, needs, etc. Some online systems may allow some customization, e.g., customizing a training program based on age, gender or other such user-related parameters, but these online systems may not be capable of monitoring or evaluating the performance of the user in the training program, may not be capable of making recommendations to the user or adjusting the training program based on the performance, thereby rendering the training program useless or less useful in improving the wellness of the user. These and other drawbacks exist.

SUMMARY

The disclosed embodiments relate to systems and methods for facilitating generation and presentation of training data on a user device and adjusting the training data based on a performance of a user. The training data may include information regarding a set of physical tasks or cognitive tasks to be performed by the user.

In some embodiments, a computer system presents training data that is customized to a human subject (referred to as a "user"). The training data may include a number of tasks such as physical tasks (e.g., physical exercises) or cognitive tasks to performed by the user. In some embodiments, the training data may include tasks for improving human balance capabilities.

The computer system may be configured to monitor the actions of the user in performing the tasks (e.g., using sensors such as a camera, a microphone, an accelerometer, a gyroscope, a heart rate sensor, an electrocardiogram sensor, a blood oxygen level sensor, or other sensors), process sensor data to determine performance data (e.g., physical performance data or cognitive performance data) that is indicative of the performance of the user in performing the tasks, and adjust the training data based on the performance data (e.g., change the physical or cognitive tasks or parameters of the physical or cognitive tasks to increase or decrease a difficulty level for the user in performing the tasks. The computer system may also adjust the training data based on user feedback (e.g., whether performance of the tasks increases or decreases pain, make them feel nauseous, etc.). In some embodiments, the computer system may also present recommendations to the user based on the performance data. For example, the computer system may determine from the sensor data that the user is moving a portion of the user's body in a direction different from the expected direction and notify the user on the user (e.g., via video, audio, textual or other feedback formats) to correct the action accordingly.

The training data or adjusting of the training data may be determined based on user profile data or performance data of the user in various ways, for example, based on specified criteria/rules/policies or based on a prediction model. In some embodiments, training information may be provided as input to a prediction model to generate predictions related to training data. As an example, the training information may indicate (a) user profile data, sensor data, or performance data, (b) set of physical tasks or cognitive tasks to be performed, (c) adjustments made to the physical tasks or cognitive tasks to increase or decrease difficulty level, or other such data. In some embodiments, whether the performance data of the user corresponding to a specified set of tasks or to an adjusted specified set of tasks satisfied a specified condition, whether was an improvement in the health condition was exhibited based on the physical tasks or cognitive tasks presented to the user, or other such data may be provided as reference feedback to the prediction model. As an example, the reference feedback may indicate that the performance data corresponding to a first set of tasks presented to the user satisfied the specified condition, but adjusting the first set of tasks to a second set of tasks performance resulted in the performance data not satisfying the specified condition. The prediction model may update one or more portions of the prediction model based on the predictions and the reference feedback information. Subsequent to the updating of the prediction model, the prediction model may be used to process the performance data to determine or adjust the training data to be presented to the user.

Various other aspects, features, and advantages of the inventions will be apparent through the detailed description of the invention and the drawings attached hereto. It is also to be understood that both the foregoing general description and the following detailed description are exemplary and not restrictive of the scope of the inventions. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
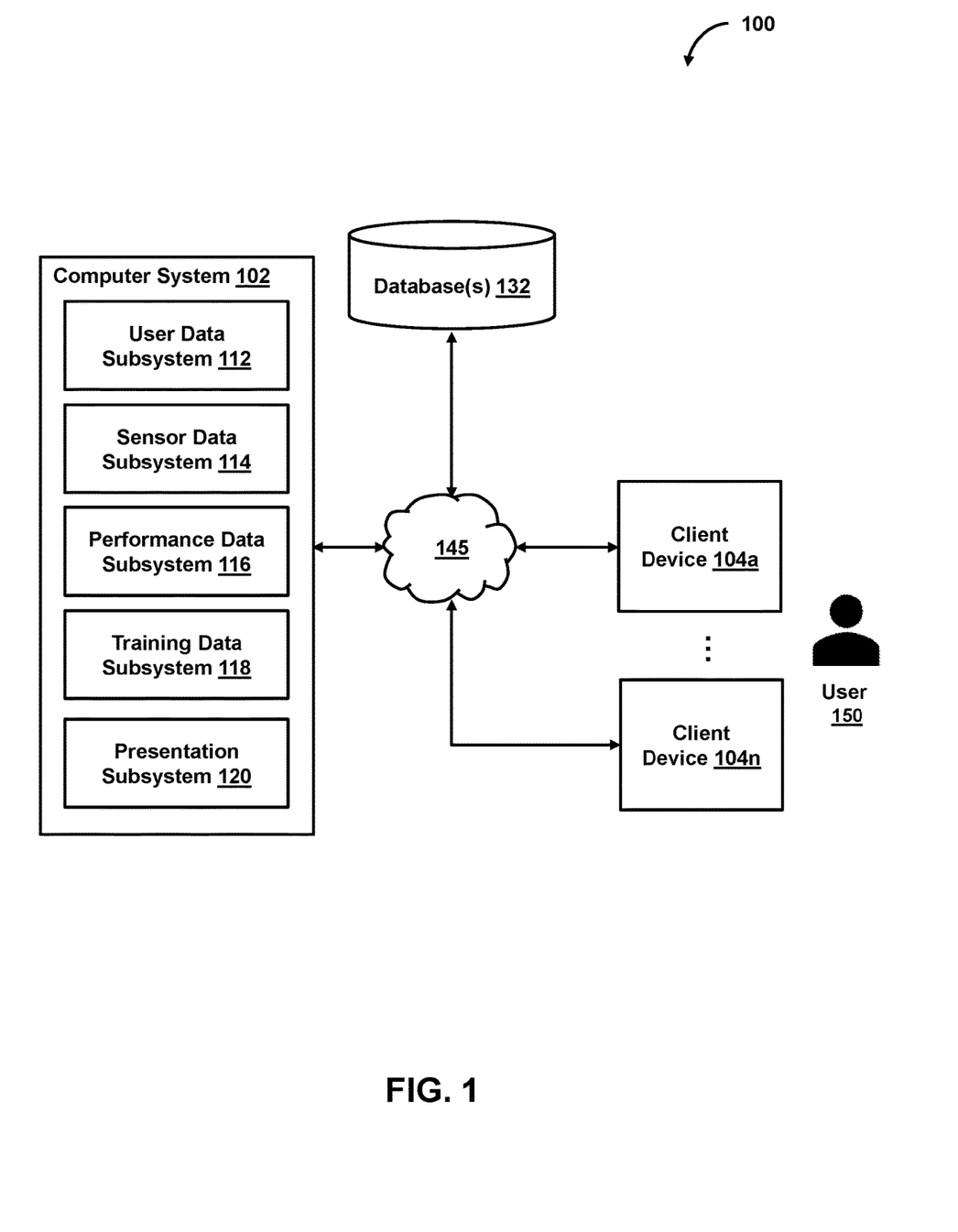
FIG. 1 shows a system for facilitating presentation of training data to a user, in accordance with one or more embodiments.

FIG. 1 shows a system 100 for facilitating presentation of training data to a user, in accordance with one or more embodiments. As shown in FIG. 1, system 100 may include computer system 102, client device 104 (or client devices 104*a*-104*n*), or other components. Computer system 102 may include user data subsystem 112, sensor data subsystem 114, performance data subsystem 116, training data subsystem 118, presentation subsystem 120, or other components. Computer system 102 may present training data to a user 150 via a client device 104. By the way of example, computer system 102 may include any computing device, such as a personal computer (PC), a laptop computer, a tablet computer, a hand-held computer, other computer equipment (e.g., a server). Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers (e.g., computer system 102), or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 generates training data to be presented to a user. As an example, the training data may include a number of tasks, such as a set of physical tasks or cognitive tasks, to be performed by a user 150. As an example, the set of physical tasks may include physical exercises to be performed by the user 150 and the set of cognitive tasks may include cognitive challenges to be solved by the user 150; these exercises may be used concurrently to create a dual-tasking scenario. The tasks may be generated for improving a specific health condition of the user 150. In some embodiments, the tasks may be directed to improving balance capabilities (e.g., physical balance) of the user 150. As an example, the tasks may include physical exercises such as unilateral forward short lunge, forward long lunge, rear short lunge, unilateral deep lunge, dynamic short lunge, dynamic long lunge, side step lunge alternating, side step lunge progressing, alternating forward lunge, or other physical exercises. In some embodiments, the cognitive tasks may include spatial memory, visual spatial, visual attention, processing speed, auditory, executive function, verbal memory, visual memory related tasks, or other tasks. As an example, a cognitive task may include the user identifying (e.g., speaking out or using a keyboard, mouse or other input device) a color of one or more balloons presented in the display of the client device 104 that pops. The tasks may be presented in any of various formats, e.g., an image, a video, an audio, textual or other formats.

In some embodiments, system 100 may present the training data to the user 150 in various ways. As an example, the user 150 may access the training data using a web-based application, such as a web browser, on the client device 104. As another example, the user 150 may access the training data via a mobile application installed on the client device 104.

In some embodiments, the system 100 may monitor user-related parameters or actions performed by the user 150 using sensors associated with the client device 104. As an example, the system 100 may use sensors, such as a camera, a microphone, an accelerometer, a gyroscope, a heart rate sensor, an electrocardiogram sensor, a blood oxygen level sensor, a keyboard, mouse, or other sensors. The system 100 may determine a movement pattern of the user 150 in performing the set of physical tasks based on the data from the sensors. The movement pattern may indicate a control, confidence or stability of the user 150 in performing the tasks. For example, the movement pattern may indicate a plane of movement or a speed of movement of the user 150 in performing a physical task. The system 100 may determine performance data (e.g., movement pattern) of the user 150 based on the sensor data. As an example, the performance data may indicate a match between movement pattern of the user 150 and a desired movement pattern for a specific exercise, a variance in deviation of the movement pattern from the desired movement pattern, a variance in the speed of movement of the user 150, or other such data. The performance data may also track the performance of the user in solving the cognitive tasks. As an example, the cognitive performance data may include a number of cognitive tasks solved correctly, an amount of time taken to perform the tasks, or other such data. In some embodiments, the training data may indicate the user 150 to perform a physical task and a cognitive task together, concurrently or simultaneously. The performance data may also include data indicating the performance of the user 150 in performing both types of tasks concurrently. In some embodiments, the performance data may also facilitate comparison of the performance of the user in performing the concurrent tasks with each task separately. Additional details with reference to determining the performance data is described at least with reference to the performance data subsystem 116.

In some embodiments, the system 100 may adjust the training data based on the performance data. System 100 may determine, based on the performance data, whether to maintain the current set of tasks, adjust one or more parameters of the current set of tasks (e.g., number of repetitions of a task to be performed, frequency of the tasks, or other such parameters), or adjust training data by changing the current set of tasks to a different set of tasks (e.g., tasks of a higher or lower difficulty/challenge level). The system 100 may change the tasks (e.g., either physical or cognitive task) based on at least one of physical performance data or cognitive performance data. In some embodiments, system 100 may determine to change a first set of physical tasks to a second set of tasks of an increased difficulty level based on the performance data satisfying a specified condition. As an example, system 100 may adjust the first set of physical tasks to the second set of physical tasks of an increased difficulty level based on the performance data indicating that (a) movement pattern (e.g., plane of movement or speed of movement of the user in the plane of movement) of the user 150 matches the desired movement pattern of the first set of physical tasks, (b) a variance in excursion or deviation of the movement pattern from the desired movement pattern over a period is reducing or below a threshold, or (c) other such performance data. As another example, system 100 may adjust the first set of physical tasks to a third set of physical tasks of a decreased difficulty level based on the performance data indicating that (a) movement pattern (e.g., plane of movement or speed of movement of the user in the plane of movement) of the user 150 while performing cognitive tasks does not match the desired movement pattern of the first set of physical tasks, (b) number of the cognitive tasks solved or solved correctly while performing the physical tasks does not satisfy a specified condition, (c) a variance in excursion or deviation of the movement pattern from the desired movement pattern over a period is increasing or above a threshold, or (d) other such performance data.

The system 100 may present the adjusted training data to the user 150. As the user 150 continues performing the tasks presented in the training data, the system 100 may progressively adjust the training data based on the monitored performance of the user 150, thereby helping the user 150 in improving or maintaining wellness (e.g., a specific health condition such as a physical balance of the body). The training data may be generated as a daily training program, a weekly training program, a single session program, a set number of sessions, or for other periods.

In some embodiments, system 100 may train a prediction model to determine the training data (e.g., a set of physical tasks or cognitive tasks) to be presented to the user 150. In some embodiments, system 100 may obtain user profile data and provide such information as input to a prediction model to generate predictions (e.g., training data) for a user. As an example, the user profile data may include age, gender, health condition, demographic data, diet, health related parameters, or other user parameters. In some embodiments, system 100 may also provide performance data indicative of a performance of the user as input to the prediction model, and the prediction model may generate the predictions (e.g., adjusted training data) based on the sensor data. As an example, the performance data may include movement pattern of the user or cognitive performance of the user.

In some embodiments, system 100 may train the prediction model by providing training data (e.g., that helped a user in improving the wellness) associated with a number of users and user profile data as input to the prediction model, and the prediction model may update one or more portions of the prediction model based on the predictions (e.g., predicted training data) and the input training data. In some embodiments, system 100 may provide performance data (e.g., movement pattern or cognitive performance of the user) as reference feedback information to the prediction model, and the prediction model may update one or more portions of the prediction model based on the predictions and the performance data. As an example, the reference feedback information may indicate whether the performance data of the user showed an improvement or deterioration for the predicted training data. In this way, for example, the prediction model may be trained or configured to generate more accurate predictions. As such, in some embodiments, subsequent to the updating of the prediction model, system 100 may use the prediction model to determine the training data for a user based on user profile, and optionally performance data.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
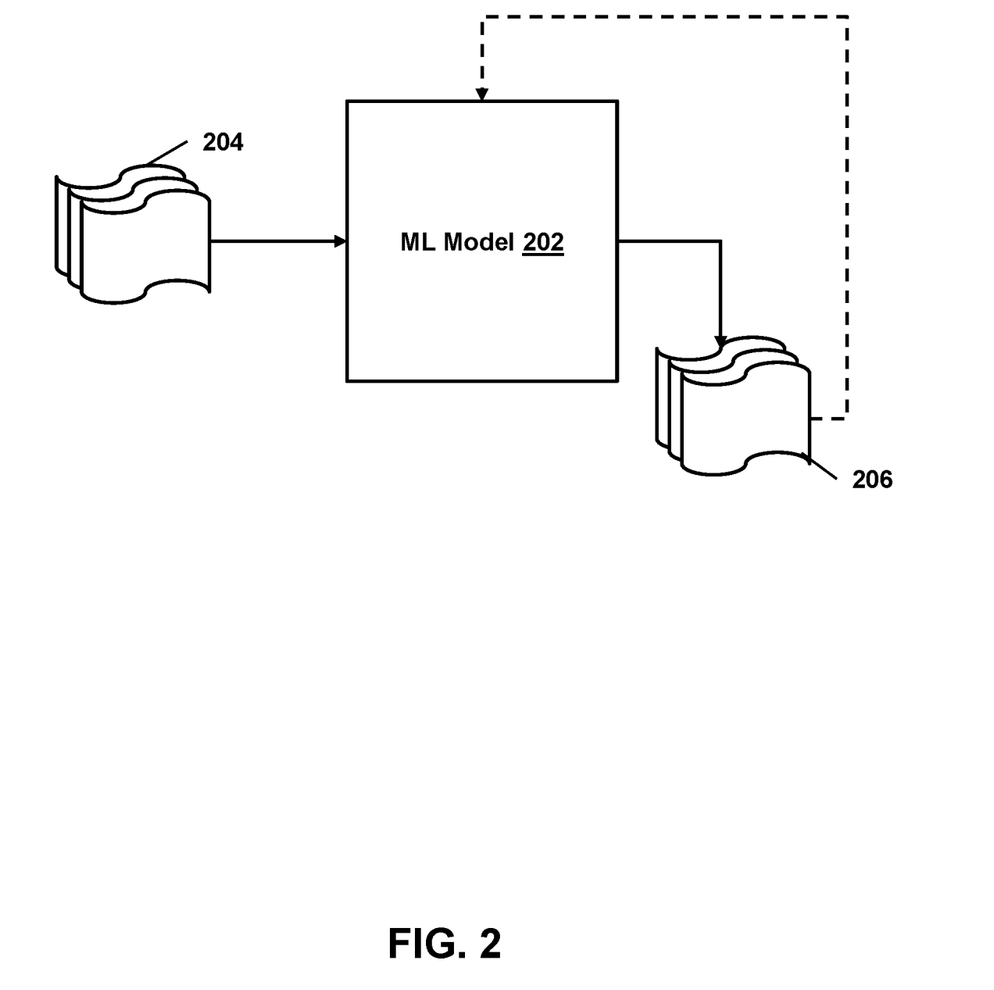
FIG. 2 shows a machine learning model configured to facilitate generation or adjustment of training data, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-120

In some embodiments, user data subsystem 112 facilitates management (e.g., adding, removing, or editing) of user profile data. The user profile data may include user related data such as a username, user contact information (e.g., telephone number, email ID), age, sex, demographic data, health conditions, health related parameters (e.g., blood sugar, blood pressure, weight, height, medical history, etc.), user preferences (e.g., preferences for one type of tasks over other), or other such parameters. In some embodiments, the user profile data may also include user information, such as a social network with which the user is associated, contact information of a caregiver of the user, hospital, health insurance provider, or other facilities associated with providing care for the user, or other information. User data subsystem 112 may provide a graphical user interface (GUI), which the user 150 may access via the client device 104, for managing the user profile. In some embodiments, user data subsystem 112 may store the user profile data in database 132.

Figure 3:
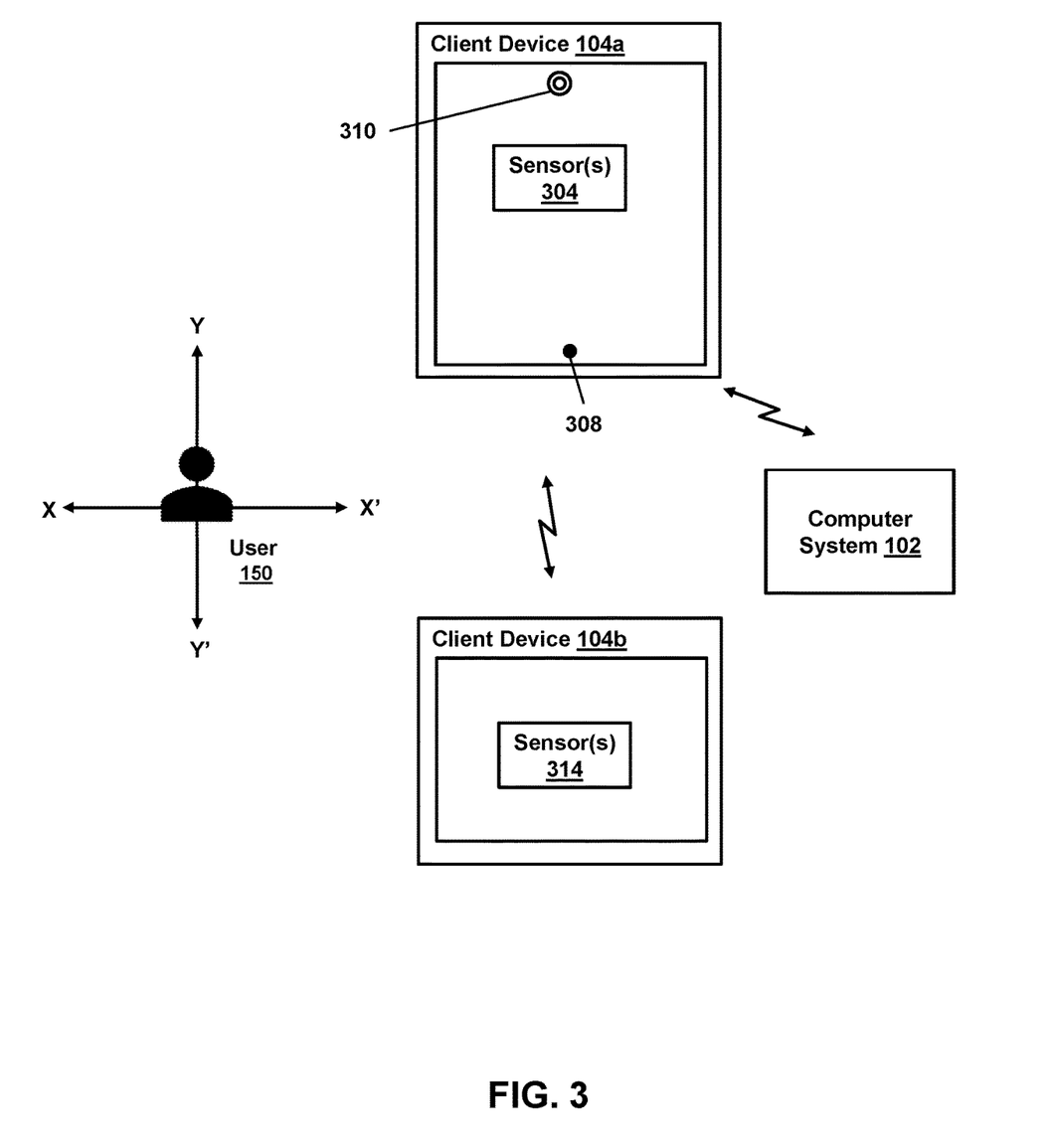
FIG. 3 shows a computer system facilitating presentation of training data to the user, in accordance with one or more embodiments.

In some embodiments, sensor data subsystem 114 facilitates management of sensor data. In one scenario, as illustrated in FIG. 3, sensor data subsystem 114 may utilize one or more components of client device 104a to obtain sensor data representative of a performance of the user 150 in performing the tasks (e.g., physical or cognitive tasks) of the training data. As an example, sensor data subsystem 114 may request microphone 308 and camera 310 of client device 104a for the audio/visual data related to the performance of user 150. In response, client device 104a may have the microphone 308 "listen" to and camera 310 "view" the performance of the user 150 to capture the audio/visual data and transmit the captured audio/visual data to computer system 102. In some embodiments, sensor data subsystem 114 receives the audio/visual data from client device 104a in real-time. The audio/visual data may include audio data of the user 150, such as a voice of the user 150 in performing a task (e.g., solving a cognitive task by speaking an answer to a question presented on a display of the client device 104a), or any other sound that may be captured by the microphone 308. Similarly, the audio/visual data may include video data having a video image of the user 150 performing a task (e.g., movement of the user in performing a physical task or cognitive task) or any other aspects that may be captured by the camera 310.

In some embodiments, sensor data subsystem 114 may request other sensor data from sensor 304 of client device 104a. As an example, sensor 304 may include a global positioning system (GPS) device that provides a location of the user 150 as sensor data. As another example, sensor 304 may include an accelerometer that provides a rate of motion of user 150.

In some embodiments, sensor data subsystem 114 may request sensor data from more than one client device associated with the user 150. As an example, the sensor data subsystem 114 may request audio/visual data from the client device 104a (e.g., a laptop, a desktop, a tablet or other computer system) and other sensor data, such as rate of motion or movement data, orientation data, heart rate data, electrocardiogram data, blood pressure data, etc., from sensor 314 of a client device 104b (e.g., a smart watch, or other wearable device). The sensor 314 may include an accelerometer, a gyroscope, a heart rate sensor, an electrocardiogram sensor, a blood oxygen level sensor, or other sensor. The sensor data subsystem 114 may obtain the sensor data from the client device 104b directly or via the client device 104a.

In some embodiments, the sensor data subsystem 114 may provide a GUI for managing the sensor data (e.g., adding, deleting or changing sensor data). The sensor data subsystem 114 may store the sensor data in database 132.

In some embodiments, the performance data subsystem 116 facilitates management of performance data of the user 150. The performance data subsystem 116 may determine the performance data based on the sensor data. The performance data may include physical performance data that is representative of the user performance in the physical tasks and cognitive performance data that is representative of the user performance in the cognitive tasks. As an example, the physical performance data may include movement pattern of the user 150, which may be indicative of a control, stability or confidence of the user 150 in performing a physical task, and may be determined based on a plane of movement or a speed of movement of the user 150 in performing the physical task. In some embodiments, a plane of movement is a plane in physical space the user 150 moves the body or a portion thereof in performing a task. As an example, X-X' may be a first plane of movement and Y-Y' may be a second plane of movement of the user 150 as illustrated in FIG. 3. In some embodiments, the speed of movement may be the rate of motion of the body or a portion thereof in a desired plane of movement. The performance data subsystem 116 may obtain the plane of movement and speed of movement data from the sensor data (e.g., based on video data, accelerometer data, gyroscope data etc.).

Upon obtaining the plane of movement and speed of movement data for the current training session of the user 150 from the client device 104, the performance data subsystem 116 may determine a deviation of the plane of movement of the user 150 from a desired plane of movement (e.g., an expected plane of movement associated with a specific physical task) as part of the physical performance data. In some embodiments, the more the movement in the desired plane of movement the more stable the use is while performing the physical task. Conversely, movement in the plane perpendicular to the desired plane of movement is an indicator of instability. In some embodiments, the lesser the deviation the more stable the user 150 is. The performance data subsystem 116 may quantify the deviation in one of various units. For example, the deviation may be quantified as a percentage (e.g., "10%," "20%," "65%," or other percentage of deviation from the desired plane of movement). In another example, the deviation may be quantified as a score (e.g., higher the deviation percentage lower the performance score).

In some embodiments, the performance data subsystem 116 may obtain historical deviation data (e.g., deviation data for prior training sessions of the user 150) of the user 150 from the database 132 for a specified period (e.g., last 10 days, last 15 days, last 10 sessions, or other periods) and determine a variance in the deviation of the plane of movement for the specified period as part of the physical performance data. In some embodiments, the performance data subsystem 116 may determine the variance after every training session of the user 150. In some embodiments, a reducing variance may be indicative of a better or progressive performance of the user 150 in performing the physical tasks. In contrast, an increasing variance may be indicative of a deteriorating performance of the user 150 in performing the physical tasks.

In some embodiments, the performance data subsystem 116 may obtain historical speed of movement data (e.g., speed of movement data for prior training sessions of the user 150) from the database 132 for a specified period and determine a variance in the speed of movement as part of the physical performance data. In some embodiments, the performance data subsystem 116 may determine the variance after every training session of the user 150. In some embodiments, a reducing variance may be indicative of a better or progressive performance of the user 150 in performing the physical tasks. In contrast, an increasing variance may be indicative of a deteriorating performance of the user 150 in performing the physical tasks.

In some embodiments, cognitive performance data may be determined based on one or more parameters, e.g., a number of cognitive tasks solved, a number of cognitive tasks solved correctly, time taken to solve a cognitive task, or other such parameters. In some embodiments, the performance data subsystem 116 may also determine the physical performance data of the user 150 in a "dual task" mode, that is, when the user 150 performs the physical tasks and the cognitive tasks simultaneously. In some embodiments, motor control and motor learning may be affected by the cognitive load present during a physical task. Dual task performance may be a complex measure of cognitive load and variability tolerance in reflexive balance skills. In some embodiments, the dual task performance has been validated to correlate closely with fall risk, mental capacity decline or neurovascular disease states. Thus, the measurement of this dual task performance may be useful in improving or maintain a health condition (e.g., reducing the fall risk with an improved tolerance for multifaceted environmental distractions that may frequently increase the chance for older adults to experience a fall.) In some embodiments, such a dual task performance measurement may be made with measuring the physical performance data associated with performance of the physical tasks alone, and then measuring the physical performance data when the user 150 performs the physical tasks and the cognitive tasks simultaneously. In some embodiments, a decrease in the physical performance (e.g., regardless of the cognitive performance) may be indicative of an interference of the cognitive load in performance of the physical tasks in a way that may increase the chance of a fall. In some embodiments, a cognitive performance below a specified threshold (e.g., number of correct answers not satisfying a threshold) or a decrease in the cognitive performance over a period may also be indicative of a degradation of cognitive skills that may be a predictor of dementia or neuropathology. A reduction in the variance of deviation or speed and a cognitive performance above a threshold may indicate improvement of motor control and task specific learning.

In some embodiments, the performance data subsystem 116 may provide a GUI for entering user feedback regarding the performance of the tasks. For example, the user 150 may indicate a health condition experienced in performing a task, such as nausea, dizziness, vomiting, or other such condition. In another example, the user 150 may indicate whether the user liked or disliked a task. In yet another example, the user 150 may indicate whether he would like to perform such similar tasks in the subsequent training sessions.

In some embodiments, the training data subsystem 118 facilitates management (e.g., generation or adjustment) of the training data to be presented to the user 150. The training data subsystem 118 may generate the training data based on the user profile data (e.g., using a prediction model as described above). The training data subsystem 118 may interact with third-party systems (not illustrated), such as computer systems associated with hospitals, rehabilitation centers, a care facility, a medical institution, health insurance provider, a university, or other entities, to obtain training data for improving a specific health condition of the user 150. In some embodiments, the training data subsystem 118 may receive user selection of the set of tasks.

The training data subsystem 118 may generate the training data for a training session. A training session can be a set of tasks to be performed on a daily, on a weekly, on a monthly, for a predefined number of training sessions, or for other such periods.

The training data subsystem 118 may adjust the training data to be presented to the user 150 for a subsequent training session based on the performance data associated with one or more previous training sessions of the user 150. In some embodiments, adjusting the training data may include adjusting task parameters or removing or adding one or more tasks to change a difficulty level in performance of the tasks. As an example, adjusting a task parameter includes adjusting a number of sets to be performed for a particular task, a number of repetitions in each set, a frequency of the task in the training session, weights to be used in performing the physical task, or other task parameters. As another example, adjusting the tasks includes adding or removing one or more tasks (either cognitive or physical task) to increase or decrease a difficulty level for the user 150 in performing the tasks.

In some embodiments, the training data subsystem 118 may adjust the training data to an increased difficulty level based on the performance data of the user 150 satisfying a first adjustment condition. As an example, the training data subsystem 118 may obtain (e.g., from performance data subsystem 116 or database 132) performance data of the user 150 associated with one or more previous training sessions and determine that the performance data satisfies the first adjustment condition based on (a) a variance in deviation or speed satisfying a first variance threshold (e.g., variance below the first variance threshold), (c) a reduction in the variance in deviation or speed satisfying a first reduction threshold (e.g., reduction above the first reduction threshold), or (c) other such conditions.

In some embodiments, the physical tasks may include physical exercises such as a unilateral forward short lunge, a forward long lunge, a rear short lunge, a unilateral deep lunge, a dynamic short lunge, a dynamic long lunge, a sidestep lunge alternating, a sidestep lunge progressing, an alternating forward lunge, or other physical exercises, which are perceived to be progressively difficult. As an example, consider that the current training session had a "rear short lunge" as a physical task and the performance data subsystem 116 determines that the performance data of the user 150 satisfies the first adjustment condition. The training data subsystem 118 may adjust the training data to an increased difficulty level for a subsequent training session by adding a physical task, such as an "unilateral deep lunge" physical exercise, that is perceived to be more difficult than the "rear short lunge" physical exercise. The training data subsystem 118 may add the "unilateral deep lunge" physical exercise to the training data in addition to or instead of the "rear short lunge" physical exercise. In yet another example, the training data subsystem 118 may adjust the training data to an increased difficulty level by adjusting task parameters, e.g., increasing the number of sets or repetitions of the "rear short lunge" physical exercise instead of or in addition to adding the "unilateral deep lunge" exercise to the training data. The task data and their difficulty level information may be maintained in the database 132 and such information may also be obtained from one or more sources, e.g., third-party systems. For example, computer system 102 may interact with a computer system associated with a care facility or other medical institution to obtain information regarding various tasks and their difficulty level.

In some embodiments, the training data subsystem 118 may adjust the training data to a decreased difficulty level based on the performance data of the user 150 satisfying a second adjustment condition different from the first adjustment condition. As an example, the training data subsystem 118 may determine that the performance data satisfies the second adjustment condition based on (a) a variance in deviation or speed satisfying a second variance threshold that is greater than the first variance threshold (e.g., variance above the second variance threshold), (b) a reduction in the variance in deviation or speed satisfying a second reduction threshold that is lesser than the first reduction threshold (e.g., reduction below the second reduction threshold), or (c) other such conditions. As an example, consider that the current training plan had a "rear short lunge" as a physical task and the performance data subsystem 116 determines that the performance data of the user 150 satisfies the second adjustment condition. The training data subsystem 118 may adjust the training data to a decreased difficulty level for a subsequent training session by replacing the "rear short lunge" physical exercise with another physical task, such as a "forward long lunge" physical exercise, that is perceived to be less difficult than the "rear short lunge" physical exercise. In yet another example, the training data subsystem 118 may adjust the training data to a decreased difficulty level by adjusting task parameters, e.g., reducing the number of sets or repetitions of the "rear short lunge" physical exercise instead of replacing the "rear short lunge" exercise to the training data.

In another example, the training data subsystem 118 may maintain the training data (e.g., at the same difficulty level without changing the tasks or task parameters) based on the performance data satisfying neither the first adjustment condition nor the second adjustment condition. As an example, the training data subsystem 118 may not adjust the training data based on (a) a variance in deviation or speed being between the first and second variance thresholds, (b) a reduction in the variance in deviation or speed being between the first and second reduction thresholds, or (c) other such conditions.

In some embodiments, the training data subsystem 118 may adjust the training data based on the cognitive performance data and the physical performance data that is measured when then user 150 is performing the physical tasks and the cognitive tasks simultaneously.

The training data subsystem 118 may adjust the training data to an increased difficulty level by adjusting a physical task or cognitive task to an increased difficulty level. While examples of a physical task being adjusted to an increased difficulty level are described above, cognitive tasks may be adjusted to an increased difficulty level as follows. In some embodiments, the cognitive tasks may include spatial memory, visual spatial, visual attention, processing speed, auditory, executive function, verbal memory, visual memory related tasks, or other tasks, which are perceived to be progressively difficult. As an example, a cognitive task in the current training data session may include the user 150 identifying a color of one or more balloons popping in the display of the client device 104 by speaking out the color while performing a physical task. The training data subsystem 118 may adjust the cognitive task to an increased difficulty level by increasing the rate at which the balloons pop, or increasing the number of colors of the balloons presented on the display. The training data subsystem 118 may also adjust the cognitive task to an increased difficulty level by asking the user 150 to identify the color using a keyboard or mouse instead of speaking out the color while performing the physical task.

Similarly, the training data subsystem 118 may adjust the training data to a decreased difficulty level by adjusting a physical task or cognitive task to a decreased difficulty level. While examples of a physical task being adjusted to a decreased difficulty level are described above, cognitive tasks may be adjusted to a decreased difficulty level as follows. As an example, a cognitive task in the current training data session may include the user 150 identifying a color of one or more balloons popping on the display of the client device 104 by selecting the color using an input device such as a mouse or keyboard while performing a physical task. The training data subsystem 118 may adjust the cognitive task to a decreased difficulty level by decreasing the rate at which the balloons pop, or decreasing the number of colors of the balloons presented on the display, or by asking the user 150 to identify the color by speaking out color instead of using a keyboard or mouse.

The training data subsystem 118 may adjust the cognitive task to an increased difficulty level or a decreased difficulty level based on the cognitive performance data satisfying the first adjustment condition or the second adjustment condition. While examples of the physical performance data satisfying the first or second adjustment conditions are mentioned above, examples of cognitive performance data satisfying the first and second adjustment conditions are as follows. In some embodiments, the cognitive performance data may satisfy the first adjustment condition for increasing the difficulty level based on (a) a number of cognitive tasks completed satisfying a first completion threshold (e.g., exceeding the first completion threshold), (b) a number of cognitive tasks solved correctly satisfying a first correct tasks threshold (e.g., exceeding the first correct tasks threshold), (c) a variance in the number of cognitive tasks completed or solved correctly satisfying a first cognitive variance threshold (e.g., below the first cognitive variance threshold), (d) a reduction in the variance satisfying a first cognitive reduction variance threshold (e.g., exceeding the first cognitive reduction variance threshold), or other such conditions.

Similarly, in some embodiments, the cognitive performance data may satisfy the second adjustment condition for decreasing the difficulty level based on (a) a number of cognitive tasks completed satisfying a second completion threshold less than the first completion threshold (e.g., below the second completion threshold), (b) a number of cognitive tasks solved correctly satisfying a second correct tasks threshold lesser than the first correct tasks threshold (e.g., below the second correct tasks threshold), (c) a variance in the number of cognitive tasks completed or solved correctly satisfying a second cognitive variance threshold greater than the first cognitive variance threshold (e.g., above the second cognitive variance threshold), (d) a reduction in the variance satisfying a second cognitive reduction variance threshold lesser than the first cognitive reduction variance threshold (e.g., below the second cognitive reduction variance threshold), or other such conditions.

In some embodiments, the training data subsystem 118 may adjust the physical task, cognitive task, or both. As an example, if both the physical performance data and the cognitive performance data satisfy the first adjustment condition to increase the difficulty level, then the physical task, cognitive task, or both may be adjusted to an increased difficulty level. As another example, if the physical performance data satisfies the first adjustment condition, but not the cognitive performance data, then the physical task may be adjusted to an increased difficulty level but not the cognitive tasks (e.g., may either be maintained at the same difficulty level or adjusted to a decreased difficulty level). In some embodiments, difficulties of both tasks may be adjusted differently. For example, if the performance of the user 150 is improving, the training data subsystem 118 may increase the difficulty level of the physical tasks while reducing the difficulty level of the cognitive challenges to allow the user time to adapt to the more difficult physical tasks. In some embodiments, a "composite" or overall difficulty level includes the difficulty level of the physical and cognitive tasks together, and the training data subsystem 118 may increase the composite difficulty level by increasing the difficulty level of physical tasks while decreasing difficulty level of cognitive tasks.

In some embodiments, presentation subsystem 120 facilitates presentation of the training data to the user 150 (e.g., on a client device 104). As an example, the presentation subsystem 120 may transmit the training data to the client device 104 for presentation in a web-based application, such as a web browser. As another example, the presentation subsystem 120 may transmit the training data to the client device 104 for presentation via a mobile application installed on the client device 104. Further, the presentation subsystem 120 may facilitate the presentation of the training data in any of various formats, e.g., an image, a video, an audio, textual, or other formats. For example, the presentation subsystem 120 may present the physical tasks as a video of physical exercises. In another example, the presentation subsystem 120 may present the cognitive tasks as an audio (e.g., audio questions seeking answers from the user).

The presentation subsystem 120 may present various performance metrics associated with one or more training sessions of the user 150 in a GUI. Example of performance metrics may include deviation in movement pattern, speed of movement pattern, variance in the movement pattern or speed, reduction in variance in the movement pattern or speed, a number of cognitive tasks completed, a number of cognitive tasks solved correctly, a variance in the number of cognitive tasks completed or solved, a reduction in the variance in the number of cognitive tasks completed or solved, time taken to solve a cognitive task, a composite score that is representative of an overall performance of the user that may be determined as a combination of two or more performance metrics, or other such performance metrics. The presentation subsystem 120 may determine the metrics based on the performance data obtained from the performance data subsystem 116. The presentation subsystem 120 may present the metric in various formats. For example, the performance metric may be displayed as one or more scores, ranges, percentages, graphs, charts, animations, or other formats. In some embodiments, a visualization of these performance metrics may act as a primary motivation driver for engagement and a most likely predictor of reduced future fall risk and cognitive decline or other such health condition. In some embodiments, a reduction in variability in performance may indicate an improvement in movement pattern or motor control and task specific learning and therefore, a need for higher levels of physical challenge or cognitive dual task for optimal future learning. Conversely, degradation of skills may indicate decreased neurocognitive skills that may be predictors of dementia or neuropathology.

In some embodiments, the presentation subsystem 120 may also facilitate the user 150 in sharing the performance metrics with one or more other individuals (e.g., friends of the user 150 in a social network). The presentation subsystem 120 may also facilitate the user 150 in performing the training session with another user, a group of users, or a computer-generated user, such as an avatar (e.g., with a specified user profile-age, gender, etc.). For example, the user 150 may invite another user for a group training session and a video of all users performing the tasks in the group may be displayed on the client device 104 of each of the users. The training data presented to each of the users may be same or different. In some embodiments, the training data presented to each of the users is the same.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4:
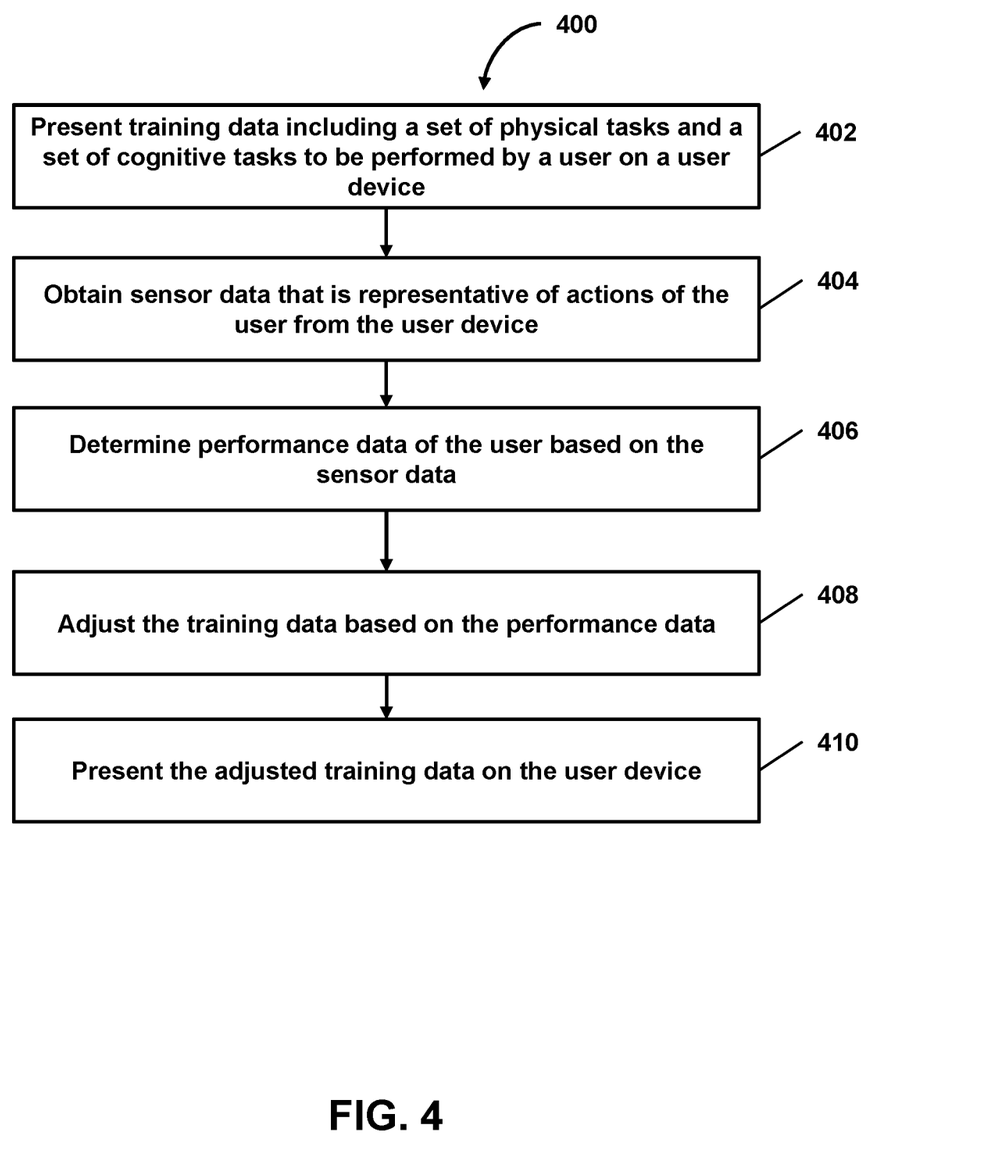
FIG. 4 shows a flowchart of a method for facilitating presentation of training data to a user, in accordance with one or more embodiments.

FIG. 4 shows a flowchart of a method 400 for facilitating presentation of training data to a user, in accordance with one or more embodiments. In an operation 402, training data including a set of physical tasks and a set of cognitive tasks are presented on a user device. The tasks may be generated for improving a specific health condition of the user 150. For example, the tasks may be directed to improving balance capabilities (e.g., physical balance) of the user 150. As an example, the tasks may include physical exercises such as unilateral forward short lunge, forward long lunge, rear short lunge, unilateral deep lunge, dynamic short lunge, dynamic long lunge, side step lunge alternating, side step lunge progressing, alternating forward lunge, or other physical exercises. In some embodiments, the cognitive tasks may include spatial memory, visual spatial, visual attention, processing speed, auditory, executive function, verbal memory, visual memory related tasks, or other tasks. As an example, a cognitive task may include the user identifying (e.g., speaking out or using a keyboard, mouse or other input device) a color of one or more balloons presented in the display of the client device 104 that pops.

Operation 402 may be performed by a component that is the same as or similar to presentation subsystem 120, in accordance with one or more embodiments.

In an operation 404, sensor data representative of user actions involved in performing the set of physical tasks or cognitive tasks are obtained. As an example, sensor data may include audio/visual data, rate of motion or movement data, orientation data, heart rate data, electrocardiogram data, blood pressure data, or other such data.

Operation 404 may be performed by a component that is the same as or similar to sensor data subsystem 114, in accordance with one or more embodiments.

In an operation 406, performance data of the user is determined based on the sensor data. The performance data may include physical performance data that is representative of the user performance in the physical tasks and cognitive performance data that is representative of the user performance in the cognitive tasks. As an example, the physical performance data may include movement pattern of the user 150, which may be determined based on a plane of movement or a speed of movement of the user 150 in performing the physical task. The physical performance data may include metrics such as a deviation of a plane of movement of the user 150 from a desired plane of movement in performing a specified task, a variance in the deviation or speed, a reduction in the variance in deviation or speed, or other such metrics. As an example, cognitive performance data may include metrics such as a number of cognitive tasks completed by the user, a number of cognitive tasks solved correctly, time taken to solve a cognitive task, a variance in the number of cognitive tasks completed or solved correctly, a reduction in the variance, or other such parameters.

Operation 406 may be performed by a component that is the same as or similar to performance data subsystem 116, in accordance with one or more embodiments.

In an operation 408, the training data is adjusted based on the performance data. As an example, the physical tasks or cognitive tasks may be adjusted (e.g., new tasks may be added, or existing tasks may be removed, or its task parameters be changed) based on the performance data to increase or decrease a difficulty level for the user in performing the tasks. Additional details with respect to adjusting the training data are described at least with reference to FIG. 5 below.

Operation 408 may be performed by a component that is the same as or similar to training data subsystem 118, in accordance with one or more embodiments.

In an operation 410, the adjusted training data is transmitted to the client device 104 for presentation to the user 150. In some embodiments, the adjustment and presentation of the adjusted training data may be performed in real-time. For example, performance data may be obtained for a set of tasks performed by the user in a current training session until a current time and a determination may be made whether to adjust the training data for a remainder of the training session based on the performance data. If a determination is made to adjust the training data, the adjusted training data may be presented to the user 150.

Operation 410 may be performed by a component that is the same as or similar to presentation subsystem 120, in accordance with one or more embodiments.

Figure 5:
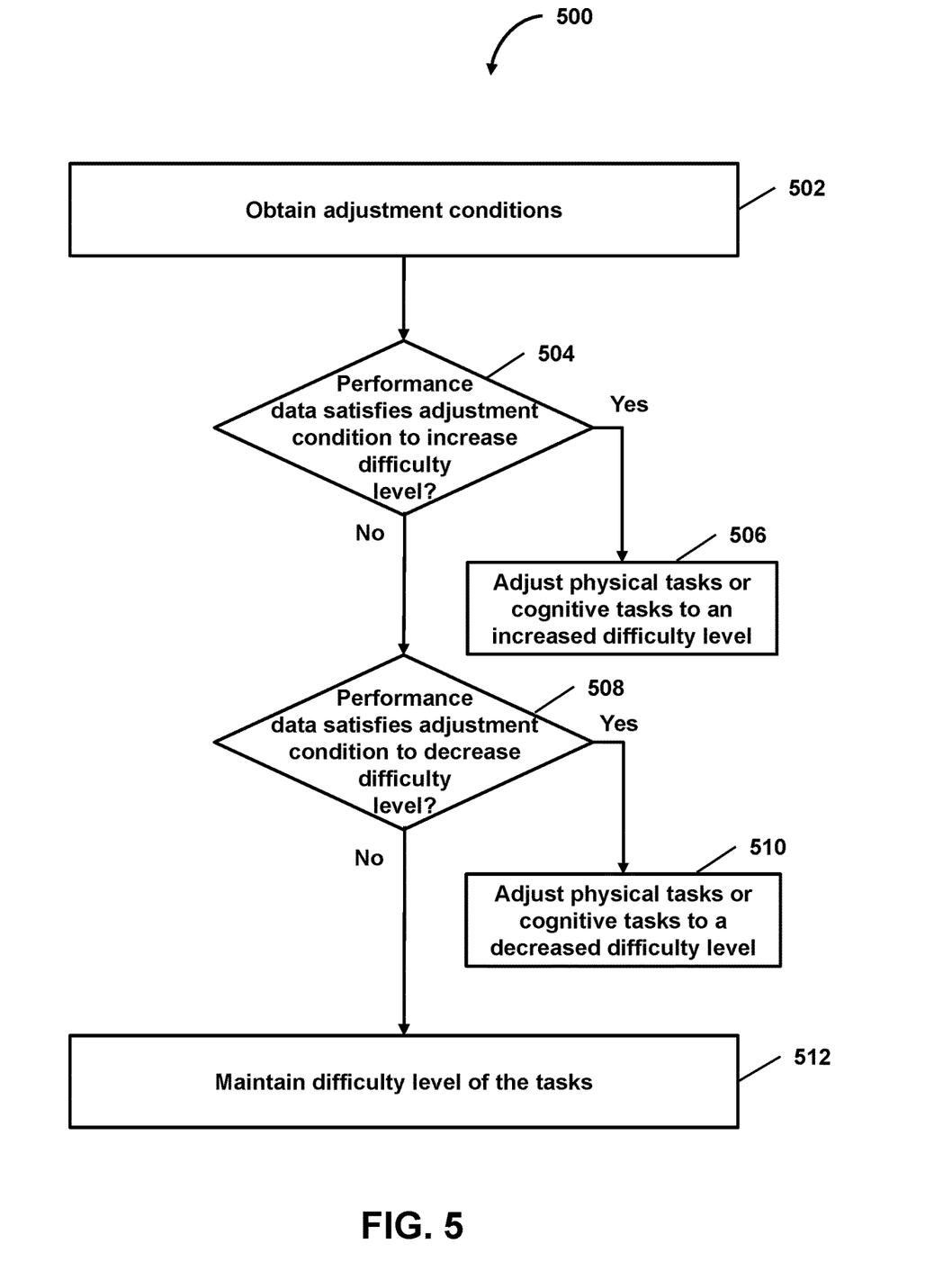
FIG. 5 shows a flowchart of a method for adjusting training data based on performance data, in accordance with one or more embodiments.

FIG. 5 shows a flowchart of a method 500 for adjusting training data based on performance data, in accordance with one or more embodiments. In some embodiments, the method 500 may be performed as part of at least operation 408 of method 400 of FIG. 4. In an operation 502, adjustment conditions for adjusting the training data may be obtained. The adjustment conditions may determine whether the tasks have to be adjusted to increase or decrease a difficulty level for the user based on the performance data. For example, a first adjustment condition may indicate that the difficulty level may be increased when (a) a variance in deviation or speed satisfies a first variance threshold (e.g., variance below the first variance threshold), (c) a reduction in the variance in deviation or speed satisfies a first reduction threshold (e.g., reduction above the first reduction threshold), or (c) other such conditions. Similarly, a second adjustment condition may indicate that the difficulty level may be decreased when (a) a variance in deviation or speed satisfies a second variance threshold that is greater than the first variance threshold (e.g., variance above the second variance threshold), (b) a reduction in the variance in deviation or speed satisfies a second reduction threshold that is lesser than the first reduction threshold (e.g., reduction below the second reduction threshold), or (c) other such conditions. Similar adjustment conditions (e.g., as described above) may also be obtained for cognitive tasks.

Operation 502 may be performed by a component that is the same as or similar to training data subsystem 118, in accordance with one or more embodiments.

In an operation 504, a determination is made whether the performance data satisfies the first adjustment condition to adjust the training data to increase a difficulty level for the user. Responsive to a determination that the performance data satisfies the first adjustment condition, in an operation 506, the training data is adjusted to increase the difficulty level. As an example, consider that the current training data had a "rear short lunge" as a physical task. The training data may be adjusted to an increased difficulty level for a subsequent training session by adding a physical task, such as an "unilateral deep lunge" physical exercise, that is perceived to be more difficult than the "rear short lunge" physical exercise. As another example, consider that a cognitive task in the current training data session may require the user 150 to identify a color of one or more balloons popping in the display of the client device 104 by speaking out the color. The training data may be adjusted to an increased difficulty level by increasing the rate at which the balloons pop, increasing the number of colors of the balloons presented on the display, or by asking the user 150 to identify the color using a keyboard or mouse instead of speaking out the color.

Referring to operation 504, responsive to a determination that the performance data does not satisfy the first adjustment condition, in an operation 508, a determination is made whether the performance data satisfies the second adjustment condition for decreasing the difficulty level. Responsive to a determination that the performance data satisfies the second adjustment condition, in an operation 510, the training data is adjusted to decrease the difficulty level. As an example, consider that the current training plan had a "rear short lunge" as a physical task. The training data may be adjusted to a decreased difficulty level for a subsequent training session by replacing the "rear short lunge" physical exercise with another physical task, such as a "forward long lunge" physical exercise, that is perceived to be less difficult than the "rear short lunge" physical exercise. As another example, consider that a cognitive task in the current training data session may include the user 150 identifying a color of one or more balloons popping on the display of the client device 104 by selecting the color using an input device such as a mouse or keyboard. The training data may be adjusted to a decreased difficulty level by decreasing the rate at which the balloons pop, or decreasing the number of colors of the balloons presented on the display, or by asking the user 150 to identify the color by speaking out color instead of using a keyboard or mouse.

Referring to operation 508, responsive to a determination that the performance data does not satisfy the second adjustment condition, in an operation 512, that difficulty level of the training data is maintained (e.g., no tasks are adjusted).

Note that the determination of whether the performance data satisfies the adjustment conditions may also depend on the user feedback. For example, the user may indicate that user had a surgery in the recent past, which may trigger the computer system 102 to generate or adjust training data to a lower difficulty level for a specified period.

Note that adjusting the training data may include adjusting one or both of the physical and cognitive tasks. Further, in adjusting both physical and cognitive tasks, a difficulty level may be adjusted for both tasks similarly or differently. For example, adjusting the training data to an increased difficulty level may include increasing the difficulty level of both physical and cognitive tasks. In another example, adjusting the training data to an increased difficulty level may include increasing the difficulty level of a physical task and decreasing a difficulty level of a cognitive task, while still resulting in an increased overall difficulty level for performing the tasks.

Operations 502-512 may be performed by a component that is the same as or similar to the training data subsystem 118, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132 or other electronic storages), one or more physical processors programmed with one or more computer program instructions, and/or other components. The computing devices may include communication lines or ports to enable the exchange of information within a network (e.g., network 145) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A method for generating training data for improving a human balance condition, the method comprising:

presenting training data on a user device associated with a user, the training data including a set of physical tasks and a set of cognitive tasks to be performed by the user;

obtaining sensor data from a multimodal sensor array including an accelerometer, a gyroscope, a microphone and a camera, wherein the sensor data corresponds to actions of the user;

processing the sensor data using a computer system to determine
(a) a movement pattern associated with the user, wherein the movement pattern includes: a speed of movement of the user and a determination of a plane of movement of the user in performing the set of physical tasks, wherein the plane of movement is a plane in physical space in which the user moves a body or a portion thereof, wherein the movement pattern is derived from video data and motion data obtained from the camera, accelerometer and gyroscope, and
(b) audio data corresponding to verbal response to a cognitive task, the cognitive task comprising a question presented on a display of the user device, wherein the audio data is captured via the microphone, and processing the sensor data comprising the movement pattern and audio data to determine performance data of the user that is indicative of a performance of the user in the set of physical tasks and the set of cognitive tasks, wherein the performance data includes a deviation of the plane of movement of the user from a desired plane of movement, a variance in the speed of movement, and a number of cognitive tasks performed correctly;

adjusting the training data based on the performance data, wherein adjusting the training data includes dynamically modifying at least one task or a parameter of the training data to increase or decrease a difficulty level for the user, the modification being based on a threshold condition related to a variance in the deviation or the variance in the speed of movement; and presenting the adjusted training data on the user device for improving a balance condition of the user.

2. The method of claim 1, wherein adjusting the training data based on the performance data includes:
adjusting the set of physical tasks based on the movement pattern associated with the user.

3. The method of claim 2, wherein adjusting the set of physical tasks includes:
adjusting the set of physical tasks based on a deviation of the movement pattern from a specified movement pattern associated with the set of physical tasks.

4. The method of claim 2, wherein adjusting the set of physical tasks includes:
obtaining, from a database associated with a computer system, historical movement patterns associated with performing the set of physical tasks;
determining a variance in a deviation of the movement pattern based on the historical movement patterns; and
adjusting the set of physical tasks based on the variance.

5. The method of claim 4, wherein obtaining the historical movement patterns includes historical movement patterns associated with the user or another user having a user profile matching a user profile of the user.

6. The method of claim 1 further comprising:
obtaining, from a database associated with a computer system, historical speed data associated with performing the set of physical tasks by the user;
determining the variance in the speed based on the historical speed data; and
adjusting the set of physical tasks based on the variance.

7. The method of claim 2, wherein adjusting the set of physical tasks includes:
adjusting the set of physical tasks to increase a difficulty level for the user in performing the set of physical tasks, the adjusting done based on the movement pattern satisfying a condition to increase the difficulty level.

8. The method of claim 2, wherein adjusting the set of physical tasks includes:
adjusting the set of physical tasks to decrease a difficulty level for the user in performing the set of physical tasks, the adjusting done based on the movement pattern satisfying a condition to decrease the difficulty level.

9. The method of claim 1, wherein adjusting the training data based on the performance data includes:
determining the movement pattern of the user while the user is performing the set of cognitive tasks; and
adjusting the set of physical tasks or the set of cognitive tasks based on the movement pattern and cognitive performance data that is indicative of a performance of the user in the set of cognitive tasks.

10. The method of claim 9, wherein adjusting the set of physical tasks includes:
adjusting the set of physical tasks to an increased difficulty level based on a deviation of the movement pattern from a specified movement pattern and the cognitive performance data satisfying a condition to increase the difficulty level.

11. The method of claim 9, wherein adjusting the set of cognitive tasks includes:
adjusting the set of cognitive tasks to an increased difficulty level based on a deviation of the movement pattern from a specified movement pattern and the cognitive performance data satisfying a condition to increase the difficulty level.

12. The method of claim 9, wherein adjusting the set of physical tasks includes:
adjusting the set of physical tasks to a decreased difficulty level based on a deviation of the movement pattern from a specified movement pattern and the cognitive performance data satisfying a condition to decrease the difficulty level.

13. The method of claim 9, wherein adjusting the set of cognitive tasks includes:
adjusting the set of cognitive tasks to a decreased difficulty level based on a deviation of the movement pattern from a specified movement pattern and the cognitive performance data satisfying a condition to decrease the difficulty level.

14. The method of claim 1, wherein adjusting the training data includes:
modifying one or more physical tasks in the set of physical tasks, one or more cognitive tasks in the set of cognitive tasks, one or more parameters of the set of physical tasks, or one or more parameters of the set of cognitive tasks.

15. A non-transitory computer-readable medium comprising instructions that, when executed by one or more processors, cause operations comprising:
presenting training data on a user device associated with a user, the training data including a set of physical tasks and a set of cognitive tasks to be performed by the user;
obtaining sensor data from a multimodal sensor array including an accelerometer, a gyroscope, a microphone and a camera, wherein the sensor data corresponds to actions of the user;
processing the sensor data using a computer system to determine
(a) a movement pattern associated with the user, wherein the movement pattern includes: measurement of a speed of movement of the user and measurement of a plane of movement of the user in a first horizontal plane and a second vertical plane perpendicular to the first horizontal plane in performing the set of physical tasks, wherein the measurements are obtained by processing video data, accelerometer data and gyroscope data obtained from the camera, accelerometer and gyroscope, respectively, and
(b) audio data corresponding to verbal response of the user to a cognitive task, the cognitive task comprising a question presented on a display of the user device, wherein the audio data is captured via the microphone, and
processing the sensor data comprising the movement pattern and audio data to determine performance data of the user that is indicative of a performance of the user in the set of physical tasks and the set of cognitive tasks, wherein the performance data includes a deviation of the plane of movement of the user from a desired plane of movement, a variance in the speed of movement, and a number of cognitive tasks performed correctly;
adjusting the training data based on the performance data, wherein adjusting the training data includes dynamically modifying at least one task or a parameter of the training data to increase or decrease a difficulty level for the user, the modification being based on a threshold condition related to a variance in the deviation or the variance in the speed of movement; and presenting the adjusted training data on the user device for improving a balance condition of the user.

16. The computer-readable medium of claim 15, wherein adjusting the training data includes:

adjusting the set of physical tasks based on the physical performance data to change a difficulty level for the user in performing the set of physical tasks.

17. The computer-readable medium of claim 16, wherein adjusting the set of physical tasks includes:

adjusting the set of physical tasks based on a deviation of the movement pattern from a specified movement pattern associated with the set of physical tasks.

18. The computer-readable medium of claim 17, wherein the operations further comprise:

obtaining, from a database associated with a computer system, historical movement patterns associated with performing the set of physical tasks;

a variance in a deviation of the movement pattern based on the historical movement patterns; and adjusting the set of physical tasks based on the variance.

19. The computer-readable medium of claim 16, wherein adjusting the set of physical tasks includes:

determining speed data based on the sensor data, the speed data indicative of a speed of movement of the user in performing the set of physical tasks;

obtaining, from a database associated with a computer system, historical speed data associated with performing the set of physical tasks by the user;

determining the variance in the speed based on the speed data and the historical speed data; and adjusting the set of physical tasks based on the variance.

20. The computer-readable medium of claim 15, wherein adjusting the training data based on the performance data includes:

determining the movement pattern of the user while the user is performing the set of cognitive tasks; and adjusting the training data based on at least one of the movement pattern or the cognitive performance data.

21. The computer-readable medium of claim 20, wherein adjusting the training data includes:

adjusting the set of physical tasks to a different difficulty level based on the cognitive performance data or a deviation of the movement pattern from a specified movement pattern.

22. The computer-readable medium of claim 20, wherein adjusting the data includes:

adjusting the set of cognitive tasks to a different difficulty level based on the cognitive performance data or a deviation of the movement pattern from a specified movement pattern.

23. The computer-readable medium of claim 20, wherein adjusting the data includes:

adjusting the set of physical tasks to a first difficulty level and the set of cognitive tasks to a different second difficulty level based on the cognitive performance data or a deviation of the movement pattern from a specified movement pattern.

24. A system comprising:

a computer system that comprises one or more processors programmed with computer program instructions that, when executed, cause operations comprising:

presenting training data on a user device associated with a user, the training data including a set of physical tasks and a set of cognitive tasks to be performed by the user;

obtaining sensor data from a multimodal sensor array including an accelerometer, a gyroscope, a microphone and a camera, wherein the sensor data corresponds to actions of the user;

processing the sensor data using a computer system to determine (a) a movement pattern associated with the user, wherein the movement pattern includes: a speed of movement of the user and a determination of a plane of movement of the user in performing the set of physical tasks, wherein the plane of movement is a plane in physical space in which the user moves a body or a portion thereof, wherein the movement pattern is derived by processing video data, accelerometer data and gyroscope data obtained from the camera, accelerometer and gyroscope, respectively, and (b) audio data corresponding to verbal response of the user to a cognitive task, the cognitive task comprising a question presented on a display of the user device, wherein the audio data is captured via the microphone, and processing the sensor data comprising the movement pattern and audio data to determine performance data of the user that is indicative of a performance of the user in the set of physical tasks and the set of cognitive tasks, wherein the performance data includes a deviation of the plane of movement of the user from a desired plane of movement, a variance in the speed of movement, and a number of cognitive tasks performed correctly; and adjusting the training data based on the performance data, wherein adjusting the training data includes dynamically modifying at least one task or a parameter of the training data to increase or decrease a difficulty level for the user, the modification being based on a threshold condition related to a variance in the deviation or the variance in the speed of movement.

* * * * *